July 29, 1969  U. W. LUDWIG  3,458,252
OPTICAL PROJECTION SYSTEM
Filed March 18, 1966

INVENTOR
Urban W. Ludwig
BY *William Grobman*
ATTORNEY

United States Patent Office 3,458,252
Patented July 29, 1969

3,458,252
OPTICAL PROJECTION SYSTEM
Urban W. Ludwig, Beltsville, Md., assignor to Singer-General Precision, Inc., a corporation of Delaware
Filed Mar. 18, 1966, Ser. No. 535,512
Int. Cl. G03b 21/00, 21/14, 21/28
U.S. Cl. 353—69
1 Claim

ABSTRACT OF THE DISCLOSURE

An optical projection system for modifying the curvature of a projected image to conform to the shape of the object upon which it is projected. The system includes a curved optical element for projecting an image of a first object having a first radius of curvature in a first direction onto a second object having a second radius of curvature or a second direction of curvature or both. The projection system is so arranged that the centers of curvature of said first object, said optical element and said second object are on a common line of sight with the spacing of the centers such that the image of the first object conforms to the external shape of the second object and is in focus thereon.

---

This invention relates to optical projection systems, and more particularly, to systems for modifying the projected image to conform to the general shape of the body upon which it is projected.

In general, most optical projection systems project an image of an object in a plane onto a planar screen. In those projection systems wherein spherical aberration is a problem, corrective elements are included. There are situations, however, where the object whose image is being projected is not planar, and there are other situations where the surface receiving the image also has a special shape. The system of this invention is designed primarily to accommodate an image which is to be projected upon a surface other than planar.

It is, therefore, an object of this invention to provide a new and improved optical projection system;

It is another object of this invention to provide a new and improved optical projection system for projecting images upon non-planar surfaces.

It is still another object of this invention to provide a new and improved optical projection system for obtaining an image having a desired curvature.

Other objects and advantages of this invention will become apparent as the following description proceeds, which description should be considered together with the accompanying drawings, in which.

Figure 1:
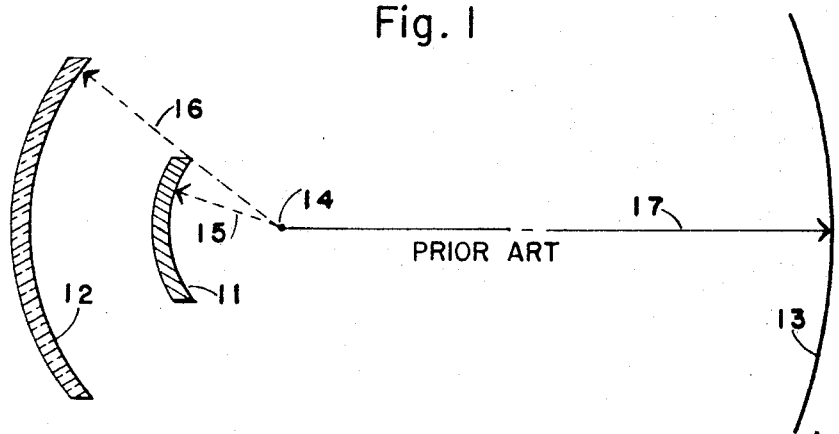
FIG. 1 is a schematic showing of a reflective projection system in which all components are curved.

Referring now to the drawings in detail and more particularly to FIG. 1, reference character 11 designates a curved object whose image is to be projected. A curved mirror 12, usually a spherical mirror, projects a curved image 13 of the object 11. The system of FIG. 1 is a concentric system in which point 14 is the center of curvature of the object 11, the reflector 12, and the image 13. The radius of the object 11 is shown at 15; the radius of the reflector 12 is shown at 16; the radius of the image 13 is shown at 17.

Generally speaking, the operation of the system shown in FIG. 1 is old and well known. Where the object 11 is curved and is concentric with the curved reflector 12, the image 13 is also curved and shares the common center of curvature 14. In this case, since all of the points on the object 11 are equidistant from the reflecting surface of the reflector 12, the image 13 which is formed thereby is spherical. When the object 11 is not concentric with the reflecting surface of the reflector 12, then the distance between the object 11 and the reflector 12 is not the same from all points on the object 11. This results in an image 13 which does not have a uniform radius of curvature.

Figure 2:
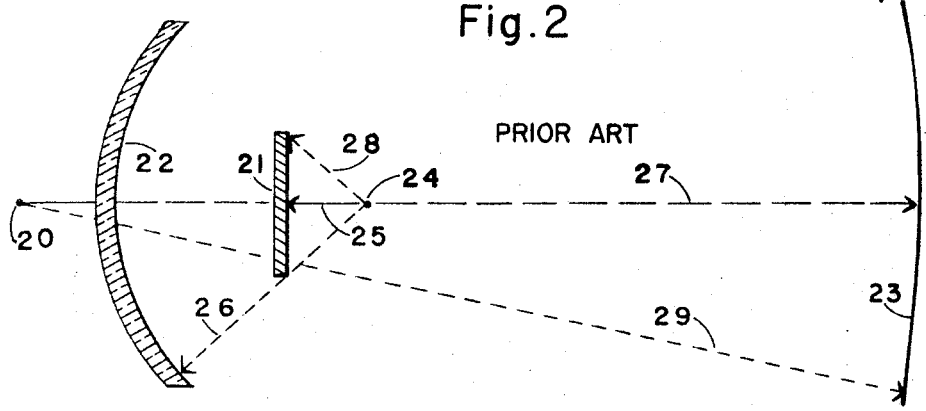
FIG. 2 is a schematic showing of a standard reflective projection system projecting an image of a planar object.

FIG. 2 illustrates a system in which an object 21 is reflected by a reflector 22 to create an image 23. The reflector 22 is, again, a curved reflector, preferably a spherical one. The object 21 is planar. The image 23 formed is a curved image and is neither planar nor spherical. In this case, the object 21 is considered to be a straightened curve.

If the system of FIG. 1 is assumed as a starting point and the object is gradually straightened from the curved object 11 of FIG. 1 to the planar object 21 of FIG. 2, the distance between the object 21 and the reflector 22 is no longer constant across the object 21. As the distance between the reflector 22 and points on the object 21 vary, so will the distance between the point 24 and the corresponding portions of the image 23 vary. In effect, the "center of curvature" of the object 21 moves toward the image 23, and the "center of curvature" 20 of the image 23 moves in the direction of the reflector 22. The radius of curvature of the reflector 22 is shown at 26. The distance between the point 20 and two points on the image 23 are shown at 27 and 29; the distance 29 being larger than the distance 27. Thus, as the object 21 is straightened, the distance between the center of curvature of the reflector 22 and the outside ends of the object 21 is increased. In a similar manner, the distance between the center of curvature 24 of the reflector 22 and the outer edges of the image 23 also increased. Since the reflector 22 is curved, the image 23 is also curved, but the center of this curve is no longer the same as that of the reflector 22.

From the above discussions of two simple projection systems, it has been shown that the shape of the image which is projected depends, to some extent, upon both the shape of the object and the shape of the reflector. This is true in a so-called concentric system. By separating the centers of curvature of the object and of the reflector, and by changing the relative curvatures of the object and the reflector, various shaped images can be created. In the co-pending United States patent application S.N. 517,271, entitled "System for Individual Star Occulting in a Projected Starfield," filed by Peter Ferko, there is described a system wherein it is necessary to project the image of a complex object upon the outer surface of a sphere. As shown in FIGS. 1 and 2, the normal image projected in this type of a projection system is one which is concave when viewed from the object. What is required in the system of the Ferko invention is an image which is convex when observed from the direction of the object.

Figure 3:
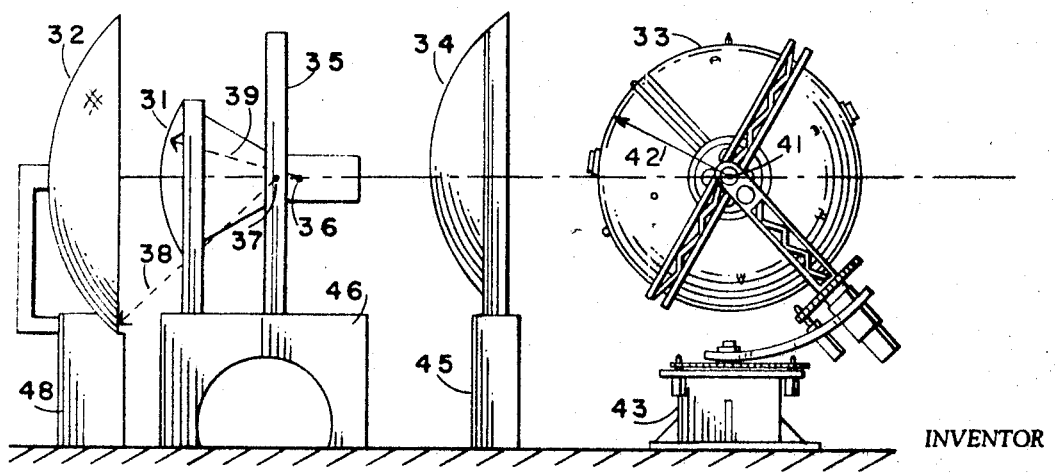
FIG. 3 is a schematic showing of the projection system of this invention.

Such a system is illustrated in FIG. 3 in which the face 31 of a cathode ray tube is reflected by a spherical mirror 32 through a Schmidt-type corrector lens 35 and a piano-convex lens 34 onto the outer surface of a sphere 33. This system requires reversing the direction of curvature of the image which appears on the face 31 of the cathode ray tube from its normal curvature to one which is in focus over the outer surface of the sphere 33.

The system in FIG. 3 is non-concentric, the point 36 serving as the center of curvature for the face 31 of the cathode ray tube and the point 37 serving as the center of curvature of the reflector 32. The radius of curvature of the face 31 is shown at 39; and the radius of curvature of the reflector 32 is shown at 38; radius 38 being greater than radius 39. The Schmidt-type corrector 35 tends to correct for spherical aberration which is produced as will be discussed below, and the lens 34 serves to compensate for the distortion introduced by the individual elements in this system. The mirror 32 is supported on a base 48; the cathode ray tube is mounted on a support 46; the lens 34 is supported on a base 45; and the star-field generator is mounted on a support 43.

As explained in the Ferko application, in the simulation of visual systems such as those used in space exploration, an observer often views an object which is interposed between him and a background such as the field of stars in the heavens. For reality, it is important that no stars "bleed through" the image of the object which is viewed by the observer. In that application, this is accomplished by projecting the starfield from a starfield generator, or planetarium, and shutting off, or occulting, the images of those stars which are supposed to be obliterated by the impression of the object being viewed. This is accomplished by projecting a corresponding image of the object being viewed upon a surface of the starfield generator which is 180° out of phase with the stars which are to be occulted. For this system to be satisfactorily operable, the image which is projected onto the starfield generator must be properly placed and must have clear, sharp outlines.

In FIG. 3, the starfield generator can be considered the sphere 33, and the image of the object being viewed is the image which appears on the face 31 of the cathode ray tube. It is necessary to project that image onto the curved surface 33 so that only the desired portions of the sphere 33 are covered by the image. Obviously, a planar image cannot be used because the shadow effects of such an image would extend over the surface portions at 33 on which no such image should appear. By selecting the curvature of the reflector 32 with respect to the curvature of the face 31 of the cathode ray tube, and by spacing the two so that the two centers of curvature 36 and 37 are displaced, an image which, when viewed from the position of the cathode ray tube, appears to be convex can readily be devised. However, in the creation of such an image, substantial distortion is introduced. Points which are spaced apart equally on the face 31 of the cathode ray tube are not spaced apart evenly on the image which is projected onto the sphere 33. The intervals between corresponding points adjacent the outer edges of the image are much greater than the distances between corresponding points toward the center of the image. A lens 34 is used to introduce barrel distortion to compensate for this distortion in the image. The Schmidt-type corrector lens 35 is used to correct for spherical aberration which is normally found in such projection systems.

In the system of FIG. 2, straightening the object 21 from the curved object 11 also increased the average radius. Or, put another way, the point of average distance from the object 21 tends to move from the point 24 toward the image 23. This, in turn, causes the center of curvature of the image 23, or what can be considered to be the average center of curvature of image 23, to move from the point 24 toward the reflector 22, and can be at point 20, for example. This effect can be extended until the center of curvature 20 moves to infinity, when the image changes direction of curvature. In FIG. 3, the radii of curvature of the reflector 32 and of the face 31 of the cathode ray tube, and the centers of curvature 36 and 37 are so selected that the result is to move the center of curvature of the image projected onto the sphere 33 to the center of the sphere at 41. A radius of curvature of the image is shown at 42.

It has been found that the direction of curvature of the image projected by a curved reflecting system as well as the radius of curvature of that image depends upon the radius of curvature of the reflector, the radius of curvature of the object, and the relative positioning of the centers of curvature of the reflector and the object. Thus, by increasing the radius of curvature of the face 31 of the cathode ray tube with respect to the radius of curvature of the reflector 32, and by moving the center of curvature of the face 31 from the location of the center of curvature 37 of the reflector 32 toward the image, the effective center of curvature of the image itself is displaced in the opposite direction and to a much greater degree. So far, a fixed relationship among these three components has not yet been determined, and the exact values must be determined by empirical means, but following the basic philosophy mentioned above, the direction of changes required are indicated. In a system of this type, there are, generally, several elements which are fixed. For example, the size of the sphere 33 is usually determined by factors outside this particular projection system. In addition, the radius of curvature of the face 31 of the cathode ray tube is normally fixed by what is available on the market. The choices are the radius of curvature of the reflector 32, which may have to be built for the particular system, and the positioning of the parts.

As mentioned above, the creation of an image such as that discussed in connection with FIG. 3, which is curved to fall, in focus, upon the outside of a sphere 33, inherently contains distortion. The distortion takes the form of gradually increasing spacing from the center of the image out toward the edges. Thus, points which are equally spaced on the face 31 of the cathode ray tube from the center out toward the edge are not equally spaced in the image which is on the sphere 33. To compensate for this distortion, the lens 34 is used. Again, the curvature of the face of the lens 34 is most easily determined by empirical means since no readily calculable relationship between the degree of distortion and the values of the other components in the system is yet devised. However, the lens 34 is designed in such a manner that the spacing of the points which are equidistant on the face 31 also appears equidistant in the image on the sphere 33. In addition to this, reflecting projection systems suffer from inherent spherical aberration which results in defocusing of the image at the outer edges. A Schmidt-type corrector 35 is mounted around the cathode ray tube and is designed to correct for the amount of spherical aberration in the partciular system. This also is empirically determined.

The above specification and the accompanying drawings have described and illustrated an improved projection system for optical images for determining the direction of curvature and the radius of curvature of an image projected by a reflecting projection system. It is realized that the above specification may indicate to others in the art additional ways in which the principles of this invention can be used without departing from the spirit thereof. It is, therefore, intended that this invention be limited only by the scope of the appended claim.

What is claimed is:

1. An optical projection system for modifying the shape of a projected image to conform to the shape upon which it is projected; said system comprising a curved object whose image is to be projected; said object having a first radius of curvature and a first center of curvature; a curved optical device for projecting an image of said object; said optical device having a second radius of curvature and a second center of curvature; a curved image receiving member; said image receiving member having a third radius of curvature and a third center of curvature; said object and said optical device being curved in the same direction; and means for supporting said object, said optical device and said image receiving member so that said first, second and third centers of curvature lie on a common line of sight with the first, second and third centers of curvature so spaced that the image of said object projected on said image receiving member conforms to the curvature of said member and is in focus thereon; said object and optical device being so supported that the first center of curvature of said object is closer to said member than is the second center of curvature of said optical device; said object comprising the face of a cathode ray tube, said optical device comprising a spherical reflector and said image receiving member comprising a portion of a sphere having a radius equal to said third radius of curvature and having said third center of curvature loacted remote from said second center of curvature and in the same direction from said reflector as is said second center of curvature to present a convex surface to said reflector to receive the image projected thereby; a correction plate inteposed between said reflector and said member for correcting the inherent spherical aberration produced by said curved reflector; and a plano-convex lens situated between said surface and said object to introduce distortion correcting for non-uniform magnification of the image of said object.

References Cited

UNITED STATES PATENTS 2,429,462 10/1947 Henroteau _____ 350—200
2,481,615 9/1949 Rheams _____ 88—24

NORTON ANSHER, Primary Examiner

RICHARD M. SHEER, Assistant Examiner

U.S. Cl. X.R.

178—7.88; 350—200; 353—98, 100